US008038124B2

(12) United States Patent
Bircann

(10) Patent No.: US 8,038,124 B2
(45) Date of Patent: Oct. 18, 2011

(54) FUEL INJECTOR HAVING A DISK VALVE WITH A FLOATING, COMPLIANT INJECTOR SEAT

(75) Inventor: Raul A. Bircann, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 161 days.

(21) Appl. No.: 12/384,961

(22) Filed: Apr. 10, 2009

(65) Prior Publication Data

US 2010/0258657 A1 Oct. 14, 2010

(51) Int. Cl.
*F16K 1/34* (2006.01)

(52) U.S. Cl. .................. 251/210; 251/129.15; 251/359; 239/533.2; 239/585.1

(58) Field of Classification Search .............. 239/87–92, 239/533.7, 533.9, 533.13, 584–585.4; 251/129.15, 251/176, 210, 359

See application file for complete search history.

(56) References Cited

U.S. PATENT DOCUMENTS

| | | | | |
|---|---|---|---|---|
| 1,746,738 | A * | 2/1930 | Pickering et al. | 251/210 |
| 2,717,001 | A * | 9/1955 | Perrault | 137/514 |
| 5,236,173 | A * | 8/1993 | Wakeman | 251/129.16 |
| 6,286,770 | B1 * | 9/2001 | Boaro et al. | 239/585.1 |
| 6,943,657 | B2 * | 9/2005 | Subramanian et al. | 335/261 |

* cited by examiner

*Primary Examiner* — Jason Boeckmann
(74) *Attorney, Agent, or Firm* — Thomas N. Twomey

(57) ABSTRACT

An improved disk-valve fuel injector comprising a self-centering, floating valve seat insert disposed in a valve body. The valve seat insert includes a circular first valve seat and the body includes a circular second valve seat concentric with the first valve seat. A spring urges the valve insert into compliance with a disk-shaped valve head. The valve insert is able to adjust position in all three dimensions, allowing the disk head to mate precisely with both seats, thereby minimizing leakage when the valve is closed, improving metering precision, and extending the working lifetime of the valve head and valve seats.

13 Claims, 2 Drawing Sheets

FUEL INJECTOR HAVING A DISK VALVE WITH A FLOATING, COMPLIANT INJECTOR SEAT

TECHNICAL FIELD

The present invention relates to fuel injectors for internal combustion engines; more particularly, to fuel injectors having disk-shaped valve closures; and most particularly, to a fuel injector having a disk valve with a floating, compliant valve seat for improved valve sealing.

BACKGROUND OF THE INVENTION

Fuel injectors having either ball-valve or disk-valve closures, referred to herein generically as "valves", are well known. In principle, a disk valve injector configuration is superior to a ball-valve configuration in terms of flow capacity and dynamic range, attributes that are very beneficial in terms of required magnetic force from the actuator and breadth of range of engine that can be effectively serviced with a single design. Taken together, these attributes of a disk-valve closure can provide increased design efficiency and effectiveness and, more importantly, reduce overall cost.

An important negative attribute of disk valving, however, particularly when a gaseous medium such as natural gas or hydrogen is metered, is leakage propensity. As a disk-valve injector generally employs relatively low lifts, compared to an equivalent flow ball-valve injector, very high flow/seal areas are required to satisfy necessary engine flow capacity. The relatively large seal area creates high sensitivities to surface imperfections and goodness-of-fit and contamination, with the slightest mismatch between disk and seat resulting in intolerable leak rates. Consequently, disk-valve fuel injectors have not enjoyed widespread use in automotive engine applications, especially in the nascent domain of gaseous fuels.

What is needed in the art is an improved disk-valve fuel injector wherein the propensity for leakage, especially with gaseous fuels, is reduced.

It is a principal object of the present invention to provide an improved fuel injector suitable for use with both liquid and gaseous fuels in internal combustion engines.

SUMMARY OF THE INVENTION

Briefly described, an improved disk-valve fuel injector in accordance with the present invention comprises a self-centering, floating valve seat insert disposed in a valve body. The valve seat insert includes a circular first valve seat, and the body preferably includes a circular second valve seat concentric with the first valve seat. A spring urges the valve seat insert into compliance with a disk-shaped valve head. The valve seat insert is able to adjust position in all three dimensions, allowing the disk head to mate precisely and reliably with both seats, thereby minimizing leakage when the valve is closed, improving metering precision, and extending the working lifetime of the valve head and valve seats.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 2:
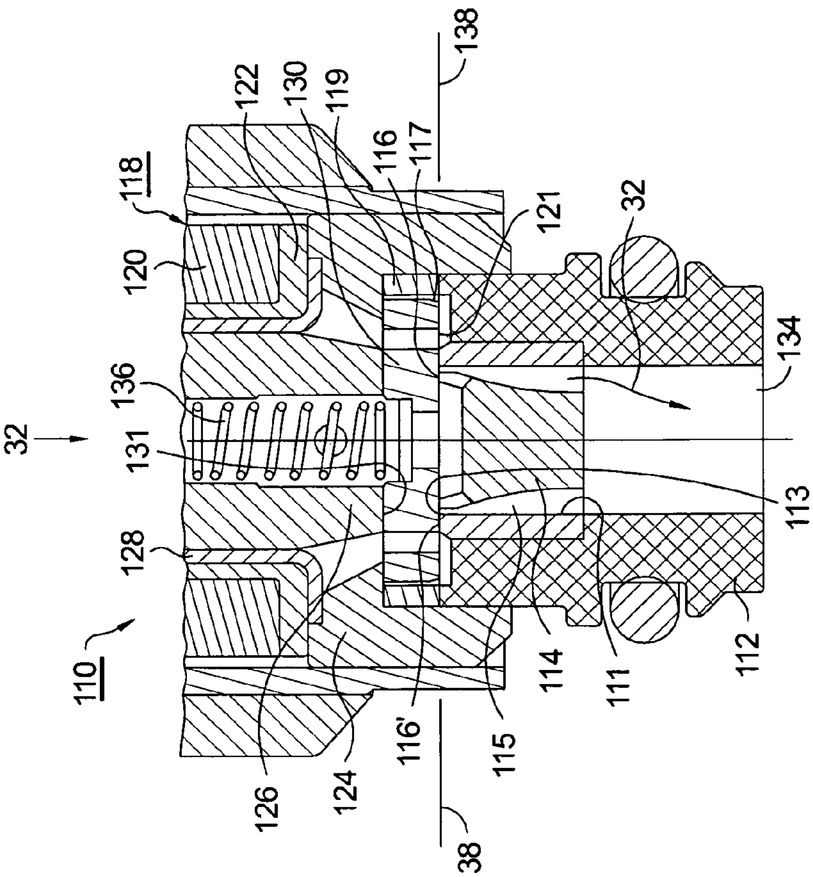
FIG. 2. (PRIOR ART)
FIG. 2 is a cross-sectional elevational view of a portion of a prior art disk-valve fuel injector.
Figure 1:
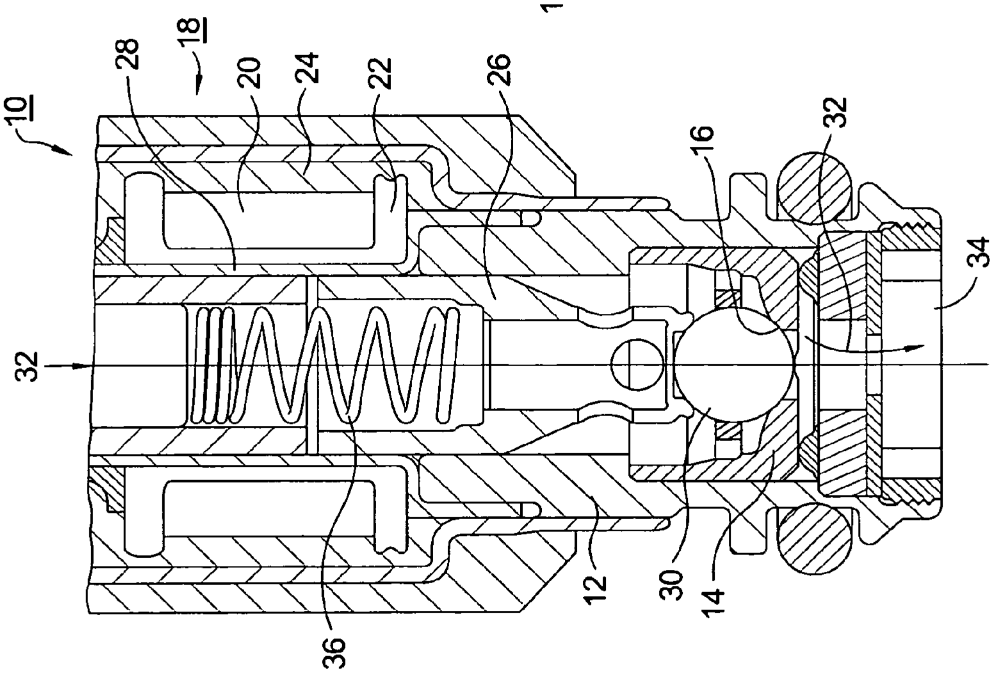
FIG. 1. (PRIOR ART)
FIG. 1 is a cross-sectional elevational view of a portion of a prior art ball-valve fuel injector.

FIGS. 1 and 2 are presented as representative of a portion of a prior art ball-valve fuel injector and a prior art disk-valve fuel injector, respectively, for comparison purposes.

Referring to FIG. 1, prior art ball-valve fuel injector 10 comprises a valve body 12 having a seat insert 14 containing a tapered metering seat 16. Valve body 12 is attached to an electric solenoid assembly 18 including electric windings 20 surrounding a spool 22 disposed in a stator 24. An axial armature 26 is slidably disposed in a non-magnetic tube 28 passing through spool 22. Armature 26 defines a pintle terminating in a ball valve head 30 that is matable with seat 16. Energizing of windings 20 causes ball head 30 to be withdrawn from seat 16, allowing passage of fuel 32 around ball head 30 and out of exit 34. De-energizing of windings 20 causes ball head 30 to be re-seated on seat 16 by the force of return spring 36 disposed in a well in pintle 26 and by the pressure of fuel within injector 10.

Referring now to FIG. 2, prior art disk-valve fuel injector 110 comprises a valve body 112 having a valve seat insert 114 containing a first planar annular metering seat ("first seat") 116. Insert 114 is provided with longitudinal fluting 115 which is full-fitting on its outer diameter in bore 111 and yet permits flow of fuel past insert 114 when the valve is open. Valve body 112 contains a second planar annular metering seat ("second seat") 116' that ideally is coplanar with first seat 116. A disk-shaped valve head 130 is freely disposed in a chamber 117 formed adjacent the first and second seats by ring insert 119 and has a planar surface 121 for mating with first and second seats 116,116' during valve closure. An electric solenoid assembly 118 includes electric windings 120 surrounding a spool 122 disposed in a stator 124 defining a first magnetic pole piece. A second magnetic polepiece 126 is disposed in a non-magnetic tube 128 passing through spool 122. Disk-shaped valve head 130 defines a free armature having axial travel within chamber 117 limited by seats 116, 116' in the valve closed position and the outer end 131 of polepiece 126 in the valve open position. Energizing of windings 120 causes head 130 to be withdrawn from seats 116, 116', allowing passage of fuel 32 both around and through head 130 and out of exit 134. De-energizing of windings 120 causes head 130 to be re-seated on seats 116,116' by the force of return spring 136 acting on disk head 130 and by the pressure of fuel within injector 110.

Generic ball-valve and disk-valve fuel injectors 10,110 are representative of the nearest prior art. The injectors are presented side by side to provide a visual assessment of the comparative difference in seal length or diameter. The ball injector seal diameter is defined by the length of mating surface of metering valve 10 and seat 12. In the disk injector the corresponding area is defined effectively by the nominal value of the metering annulus 113, which is sealed by the disk head 130. Comparatively speaking, in the case of these two injectors, which target equal flow, the seal diameter of the disk-valve injector is nearly three times larger than that of the ball-valve injector. Typically, engine and vehicle manufacturers specify permissive leakage at <0.5 cc/min, which is challenging even for small seal widths and ball-valve injectors; the larger the seal width/diameter, the more difficult to comply with this requirement. With such large seal width/diameter in a disk-valve injector, any imperfection in mating of either the disk surface 121 or the valve seats 116,116' can easily be large enough to cause the injector to exceed this specification.

Note that prior art valve seats 116,116' are concentric circular surfaces which ideally are absolutely coplanar as reference surface 138 to permit sealing of disk surface 121 against both, simultaneously and completely. However, in manufacturing practice it is extremely difficult to machine the two surfaces to an acceptable level of coplanarity.

The sensitivity of a disk-valve injector to leakage as a result of such non-coplanarity may be reduced by providing a three-dimensionally compliant interface between the disk head and one of the valve seats which facilitates conformal and preferential mating of the sealing surfaces. The present invention is directed to an arrangement that provides such a compliant interface.

Figure 3:
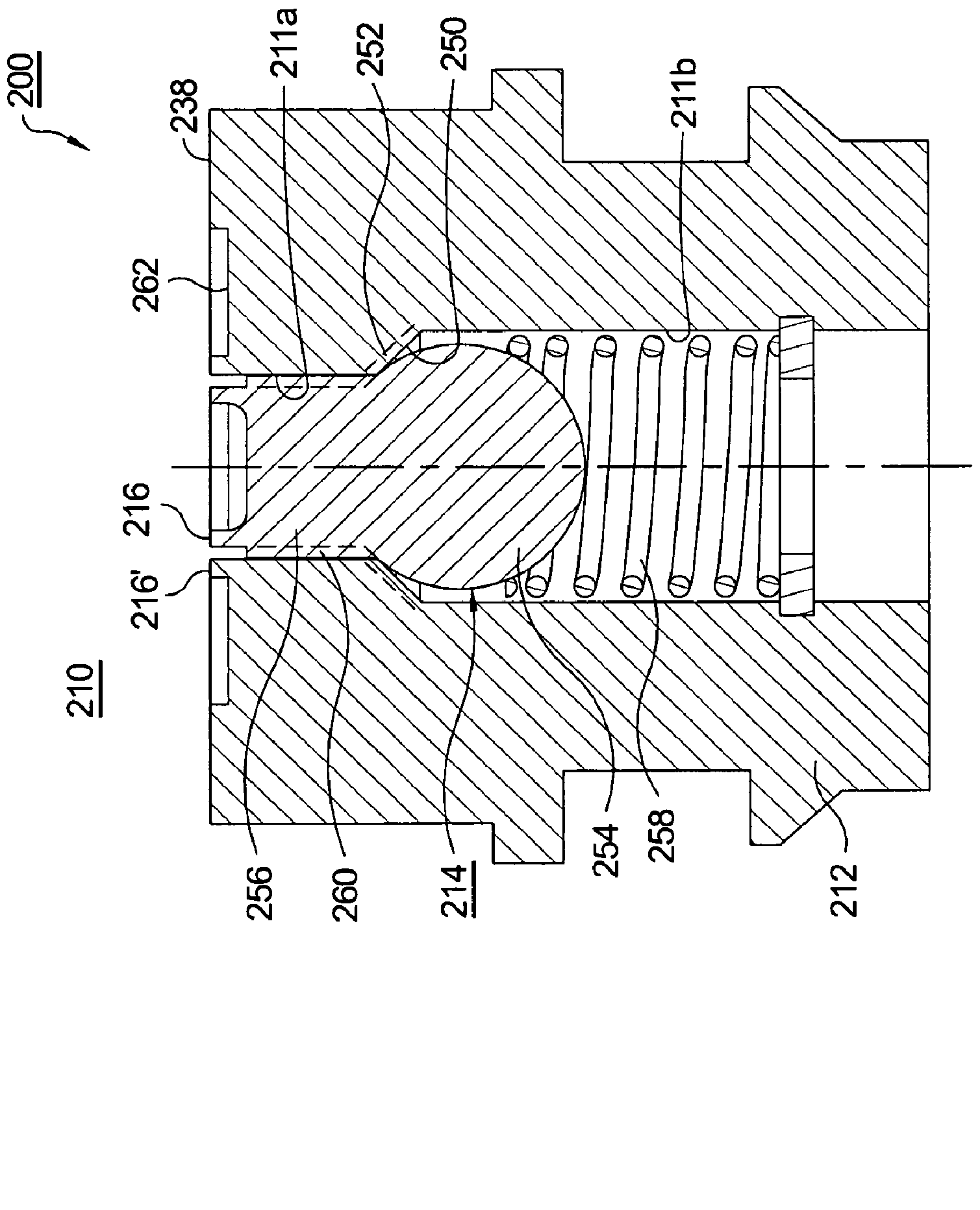
FIG. 3 is an elevational cross-sectional view of an improved disk valve assembly in accordance with the present invention for use in an improved disk-valve fuel injector.

Referring now to FIG. 3, a lower valve seat assembly 200 is shown for use in an improved disk-valve fuel injector 210 in accordance with the present invention. Valve seat assembly 200 replaces prior art valve body 112 and prior art valve seat insert 114, as shown in FIG. 2, to form such an improved fuel injector 210.

Assembly 200 comprises a valve body 212 having a stepped bore defined by a smaller-diameter bore 211*a* and a larger-diameter bore 211*b*, separated by a tapered ball seat 250 which may be fluted 252 to permit flow of fuel. An improved valve seat insert 214, comprising a ball-shaped portion 254 and a cylindrical portion 256, floats in bores 211*a*,211*b* and is urged against ball seat 250 by a spring 258 disposed in bore is 211*b*. Cylindrical portion 256 is fluted 260 and is cup-shaped at the free end, forming a circular first valve seat 216. Valve body 212 is also relieved 262 along reference surface 238 to form a circular second valve seat 216', the improved seats 216,216' being analogous to prior art seats 116,116'. Reference surface 238 is machined to be highly planar, thus providing second seat 216' as a reference stop for disk valve 130 upon closure of fuel injector 210.

The desired compliance of first seat 216, to allow first seat 216 to be absolutely coplanar with second seat 216', is provided in accordance with the present invention as follows:

Floating valve seat insert 214 is suspended by compression spring 258. Ball head 254 is retained by tapered ball seat 250 in such fashion that axial travel of insert 214 is restricted to a predetermined magnitude. Ideally, floating seat insert 214 is held against tapered ball seat 250 by compression spring 258 such that first seat 216 protrudes by about 10 μmeters beyond second seat 216'.

Additionally, the diametral clearance of cylindrical portion 256 within bore 211*a* facilitates compliance, and preferably is limited to less than about 50 micrometers to preclude cocking or switching of the floating insert within the bore. This diametral clearance allows floating seat insert 214 to be rotated slightly about the center of ball 254 as may be needed to bring seat 216 into coplanarity with seat 216'.

The force generated by spring 258 is preferably less than about 75% that of return spring 136 (FIG. 1), so that disk valve head 130 is still forced against second seat 216' as well as against floating first seat 216 when solenoid assembly 118 is de-energized. First seat 216 is depressed by the amount of the intentional protrusion within bores 211*a*,211*b* and rotated about the center of ball 254 as just described to be flush and coplanar with second seat 216' by the force of closure spring 136, thus providing a reliable seal of sealing surface 121 on both seats 216,216'.

An important secondary benefit of this arrangement is that seat insert 214 oscillates within bores 211*a*,211*b* with every cycle of solenoid assembly 118 and disk head 130. The consequent protrusion of seat insert 214 beyond second seat 216', as described above, and the spring backing of seat insert 214 provides impact kinetic energy attenuation for disk head 130 as it nears second seat 216' which is, as noted above, a fixed reference for the valve head. This feature reduces noise generated by actuation of the injector 210, increases working lifetime of the disk head and valve seats, and thereby increases long-term precision of fuel injection amount.

While the invention has been described by reference to various specific embodiments, it should be understood that numerous changes may be made within the spirit and scope of the inventive concepts described. Accordingly, it is intended that the invention not be limited to the described embodiments, but will have the full scope defined by the language of the following claims.

What is claimed is:

1. A fuel injector for an internal combustion engine, comprising a disk-valve closure including a disk-shaped valve head having a mating surface, a valve body having a stepped bore defined by a smaller-diameter bore and a larger-diameter bore separated by a tapered ball seat, and a valve seat insert floatingly disposed in said stepped bore and having a seat for selectively mating with said valve head mating surface;

wherein said valve seat insert comprises a ball-shaped portion disposed in said larger-diameter bore and a cylindrical portion disposed in said smaller-diameter bore, and wherein axial travel of said valve seat insert is limited by engagement of said ball-shaped portion with said tapered ball seat, wherein a fuel path is defined between said valve seat insert and said stepped bore.

2. A fuel injector in accordance with claim 1 wherein said seat is a first seat, and wherein said valve body includes a second seat.

3. A fuel injector in accordance with claim 2 wherein said first and second seats are substantially coplanar when said disk-valve closure is in a closed position.

4. A fuel injector in accordance with claim 3 wherein said coplanarity of said first and second seats defines a reference plane within said fuel injector, and wherein said floating valve seat insert projects beyond said reference plane when said disk-valve closure is in an open position.

5. A fuel injector in accordance with claim 4 wherein said floating valve seat insert projects about 10 micrometers beyond said reference plane.

6. A fuel injector in accordance with claim 4 wherein the position of said valve seat insert is movable to permit said coplanarity of said first seat with said second seat.

7. A fuel injector in accordance with claim 6 wherein said position is movable in three dimensions.

8. A fuel injector in accordance with claim 1 wherein the diameter of said cylindrical portion is less than the diameter of said smaller-diameter bore, defining an annular clearance between said cylindrical portion and said smaller-diameter bore.

9. A fuel injector in accordance with claim 8 wherein said annular clearance is about 50 micrometers.

10. A fuel injector in accordance with claim 1 further comprising a spring disposed in said stepped bore and operative against said valve seat insert to urge said valve seat insert toward said disk-shaped head.

11. A fuel injector in accordance with claim 1 further comprising a solenoid assembly operative of said disk-valve closure.

12. A fuel injector in accordance with claim 11 wherein said disk-valve head defines an armature for said solenoid assembly.

13. A fuel injector in accordance with claim 1 wherein said fuel path is defined by a flute in at least one of said valve seat insert and said stepped bore.

* * * * *